March 4, 1930.  C. WALES  1,749,007
PRESSURE GAUGING APPARATUS
Filed Nov. 20, 1926
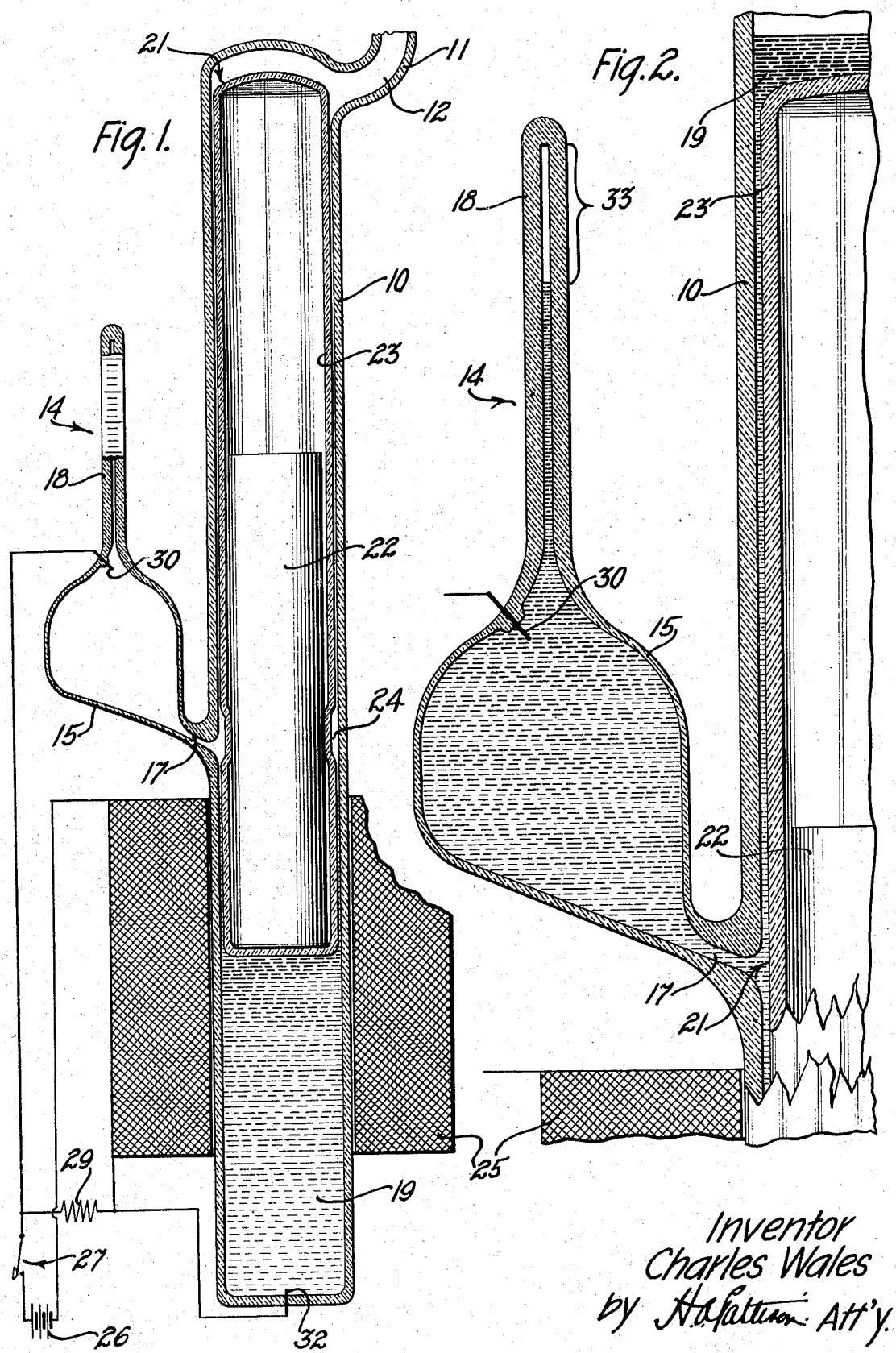
Inventor
Charles Wales
by H. A. Patterson Att'y.

Patented Mar. 4, 1930

1,749,007

UNITED STATES PATENT OFFICE

CHARLES WALES, OF LA GRANGE, ILLINOIS, ASSIGNOR TO WESTERN ELECTRIC COMPANY, INCORPORATED, OF NEW YORK, N. Y., A CORPORATION OF NEW YORK

PRESSURE-GAUGING APPARATUS

Application filed November 20, 1926. Serial No. 149,570.

This invention relates to pressure gauging apparatus, and more particularly to magnetically operable gauges for testing the quality of the vacuum in a pressure system.

In the use of certain types of pressure measuring instruments, such as the known MacLeod vacuum gauges, certain of the glass tubing or parts comprising the instrument must be moved or shifted to render a column of mercury contained therein functionally operative. Shifting such parts to vary the position of retained mercury necessitates manual operations by an attendant which must be practiced with care and skill in order to avoid the breakage of parts incident to such operations, and in order to obtain pressure readings which are within the desired degree of accuracy.

The primary object of this invention is to provide an apparatus of simple and durable construction whereby accurate pressure determinations may be quickly and easily obtained.

In accordance with the general features of the invention, one embodiment thereof comprises an upright chamber and a registering tube connected therewith, the upper extremity of the chamber being adapted for communication with a pressure system to be tested. A column of mercury within the chamber supports a solenoid float, which in response to a magnetic coil surrounding the chamber may be lowered to force a portion of the body of mercury into the registering tube a distance depending upon the quality of vacuum in the system tested.

These and other objects will be apparent from the following detailed description and the accompanying drawings, wherein Fig. 1 is a central, vertical, sectional view of an apparatus which is representative of one embodiment of the invention, and Fig. 2 is an enlarged fragmentary detailed section disclosing the relative position of the mercury within the registering means when the float is in its lowermost submerged position.

Referring now to the drawings wherein the same reference characters are employed to designate similar parts throughout the several views, an upright glass container 10 is formed at its upper extremity with a connecting tube 11 having an opening 12, the tube 11 being adapted for connection in any suitable manner with a pressure system to be tested. Formed integral with the wall of the container 10 midway between the upper and lower extremities thereof is a pressure registering means 14 which comprises a volume vessel 15 which communicates with the inside or chamber of the container 10 by means of a restricted opening 17 and is formed at its upper end with a vertically disposed capillary tube 18. The container 10 retains a supply of mercury 19 or other suitable liquid material which supports a plunger float 21. It will be observed in Fig. 1 that when the plunger float 21 is supported in its normal floating position within the container 10, the upper level in the mercury 19 will be slightly below the entrance to the restricted opening 17.

The plunger float 21 comprises a metallic solenoid plunger 22 enclosed within a sealed glass tube or shell 23. The plunger 21 is vertically slidable within the container 10 and the space between the plunger and the inner surface of the container wall is sufficient to permit of free communication between the registering means 14 and a pressure system (not shown) connected with the tube 11 when the plunger 21 normally floats upon the mercury 19 as shown in Fig. 1. An electrical coil 25 encircling the lower portion of the container 10 is adapted when energized to draw the solenoid plunger 22 and consequently the plunger float 21 in which it is contained, downwardly, and as a result the mercury 19 will be displaced upwardly. When the plunger 21 has been carried to its lowermost position within the container 10 through the action of the coil 25, it will be completely submerged within the mercury 19 as clearly shown in Fig. 2. As the plunger is being lowered a portion of the body of the mercury will be displaced into the registering means 14 through the restricted opening 17 and it will be observed that when the plunger is completely submerged, the level of the mercury within the container 10 will be positioned above the upper extremity of the capillary tube 18. By maintaining a substantially uniform head of mercury above the upper end of the capillary tube 18 for each test, a sufficient and uniform pressure will be present upon each submergence of the plunger 21 to force the mercury upwardly into the capillary tube. Thus, any air or other gas which may be trapped within the capillary tube 18 during each test, will be subjected to substantially uniform pressures. To insure against any possible obstruction of the intercommunication between the registering means 14 and the chamber within the container 10, when the plunger 21 normally floats upon the mercury 19, the tube or shell 23 is formed with an annular depression 24 which prevents any possible accumulation or adherence of mercury globules at the point where the restricted opening 17 joins with the container chamber.

One terminal of the coil 25 is connected with one terminal of a battery 26, the opposite terminal of the battery being connected with one of the contacts of a suitable switch 27 and the other contact of the switch 27 is connected to a terminal of the coil 25 through a suitable resistance 29. Upon the closing of the switch 27 the resistance 29 permits a current to flow in the circuit just described which is sufficient to cause the plunger 21 to be slowly drawn downwardly within the container 10. When the surface of the mercury body which rises within the volume vessel 15 reaches the lower extremity of the capillary tube 18, it contacts with a terminal member 30 which causes the resistance 29 to be short circuited. The operating circuit may then be traced as follows, beginning with the terminal 30 through the switch 27 to one terminal of the battery 26, from the opposite terminal of the battery 26 to one terminal of the coil 25, from the opposite terminal thereof to a terminal 32 in the bottom of the container 10 and thence back to the terminal 30 through the mercury 19. The closing of the last mentioned circuit increases the current flow through the coil 25 and consequently the speed with which the plunger 21 is lowered is correspondingly increased. By slowly raising the level of the mercury within the volume vessel 15 during the initial movement of the plunger 21 and subsequently increasing the raising thereof as it enters the capillary tube 18, the possibility of impairing the continuity of the mercury column within the capillary tube 18 is positively precluded. On the other hand, if the mercury is initially forced upwardly into the volume vessel 15 with great speed, there may be a tendency for the mercury to form a series of globules within the capillary tube instead of one continuous column, thereby rendering an accurate registration or reading impossible.

In using this instrument it may be secured in a fixed position by means of any suitable bracket (not shown) and the connecting tube 11 of the container 10 may be connected with a pressure system to be tested, such for example as an evacuated incandescent lamp or a plurality of lamps to be tested for their vacuum quality. It will be clear that the vacuum quality within the chamber of container 10 and the registering means 14 will be similar to the vacuum quality within the members which are to be tested when the plunger 21 normally floats upon the mercury 19. Upon the closing of the switch 27 and the resultant raising of the mercury level within the container 10, the space included within the volume vessel 15 and the capillary tube 18 will be cut off from the space or chamber within the container 10 and any air present within the registering means 14 will be forced upwardly due to the elevation of the mercury therein. When a head of mercury within the container 10 has been established above the capillary tube 18 by the complete submersion of the plunger 21 therein, the amount of air present within the registering means 14 will be trapped under pressure within the capillary tube, the length of this space being indicated by the bracket 33 (Fig. 2). By knowing the volume of the space contained within the registering means 14 and the volume represented by the space included by the bracket 33, a proportion may be calculated which will serve to indicate the quality of vacuum in the system or incandescent lamps tested. Visible markings may be made along the external surface of the capillary tube 18 and upon the registration of the mercury level in the tube with such markings, accurate pressure readings may very quickly be obtained. The described gauge may be conveniently fixed in one position for making a series of measurements without the necessity of moving any connecting parts as distinguished from other types of MacLeod vacuum gauges which necessitate the provision of a joint or connection between the gauge and the pressure system to be tested which will accommodate itself to the change or shift in the positions of the instrument parts. The described instrument may be permanently connected with a pressure or exhaust system and readings may be very readily and accurately obtained with the performance of a minimum number of manual operations by an attendant.

It is to be understood that the invention as herein described is not limited to the specific form of construction disclosed but is capable of other modifications which come within the true spirit and scope of the invention as defined by the appended claims.

What is claimed is:

1. In a pressure gauge, a liquid retaining means, a liquid medium contained therein, a pressure registering means for communication with a pressure system and connected with the retaining means, and means operable within the retaining means for introducing liquid from the retaining means into the registering means.

2. In a pressure gauge, a liquid retaining means, a liquid medium contained therein, a pressure registering means for communication with a pressure system and connected with the retaining means, a member within the retaining means, and means for actuating the member to displace liquid from the retaining means into the pressure registering means.

3. In a pressure gauge, a liquid retaining means, a liquid medium contained therein, a pressure registering means including a capillary tube for communication with a pressure system and connected with the retaining means, and means operable within the retaining means for forcing liquid from the retaining means into the capillary tube.

4. In a pressure gauge, an upright liquid container for communication with a pressure system, a liquid medium contained therein, a volume tube connected with the retaining means having a capillary registering tube associated therewith, and means operable within the retaining means for displacing the liquid therein so as to effect a pressure registration within the capillary tube.

5. In a pressure gauge, a container for communication with a pressure system, a medium contained therein, a registering tube connected with the retaining means, and an electrically actuated plunger within the retaining means for forcing a portion of the medium from the container into the registering tube a distance depending upon the quality of the vacuum in the system.

6. In a pressure gauge, an upright container, a liquid medium contained therein, a registering means for communication with a pressure system comprising a capillary and a volume tube connected with the container, a float within the container comprising a solenoid plunger within a sealed tube, and elecrical means for lowering the float to force liquid into the registering means.

7. In a pressure gauge, a liquid retaining means, a liquid medium contained therein, a pressure registering means for communication with a pressure system and connected with the retaining means, and means for initially introducing a portion of the liquid from the retaining means into the registering means at a predetermined speed and for subsequently increasing the speed with which the liquid is introduced.

8. In a pressure gauge, a liquid container, a liquid medium contained therein, a pressure registering means for communication with a pressure system and connected with the retaining means, a plunger float within the retaining means, and means for initially lowering the float at a predetermined speed and for subsequently increasing the speed with which the float is lowered.

9. In a pressure gauge, a liquid retaining means, a liquid medium contained therein, a pressure registering means for communication with a pressure system and connected with the retaining means, and means operable within the retaining means in response to the closing of an electrical circuit to introduce liquid from the retaining means into the registering means.

10. In a pressure gauge, a liquid retaining means, a liquid medium contained therein, a pressure registering means for communication with a pressure system and connected with the retaining means, and means independently operable and submergible within the liquid of the retaining means for associating liquid in the retaining means with the registering means.

11. In a pressure gauge, a liquid container adapted to be connected to a pressure system, a quantity of liquid in said container, a vessel communicating with said container, a capillary gauge tube communicating with the vessel, a constant volume float within the container, and means for immersing the float in the liquid to force the liquid into the vessel and gauge tube.

12. In a pressure gauge, a liquid container adapted to be connected to a pressure system, a quantity of liquid in said container, a vessel communicating with said container, a gauge tube communicating with the vessel, a float within the container comprising a magnetizable element, and magnetic means outside the container for immersing the float in the liquid to thereby force liquid into the vessel and the gauge tube.

In witness whereof, I hereunto subscribe my name this 29 day of October A. D., 1926.

CHARLES WALES.